No. 884,139. PATENTED APR. 7, 1908.
C. E. & H. N. DYER.
TRANSPLANTING MACHINE.
APPLICATION FILED JUNE 13, 1907.
2 SHEETS—SHEET 1.
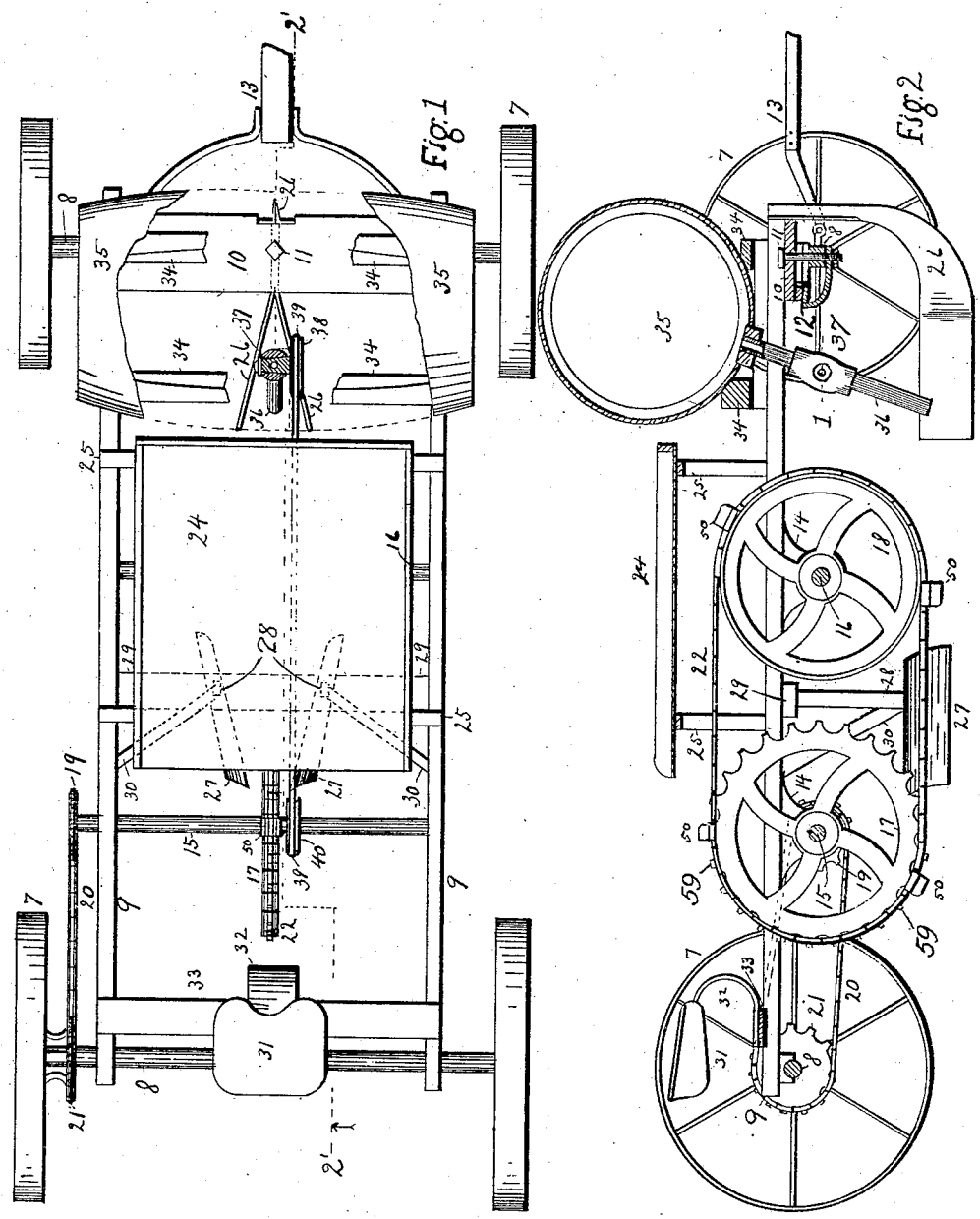
Witnesses
Inventors

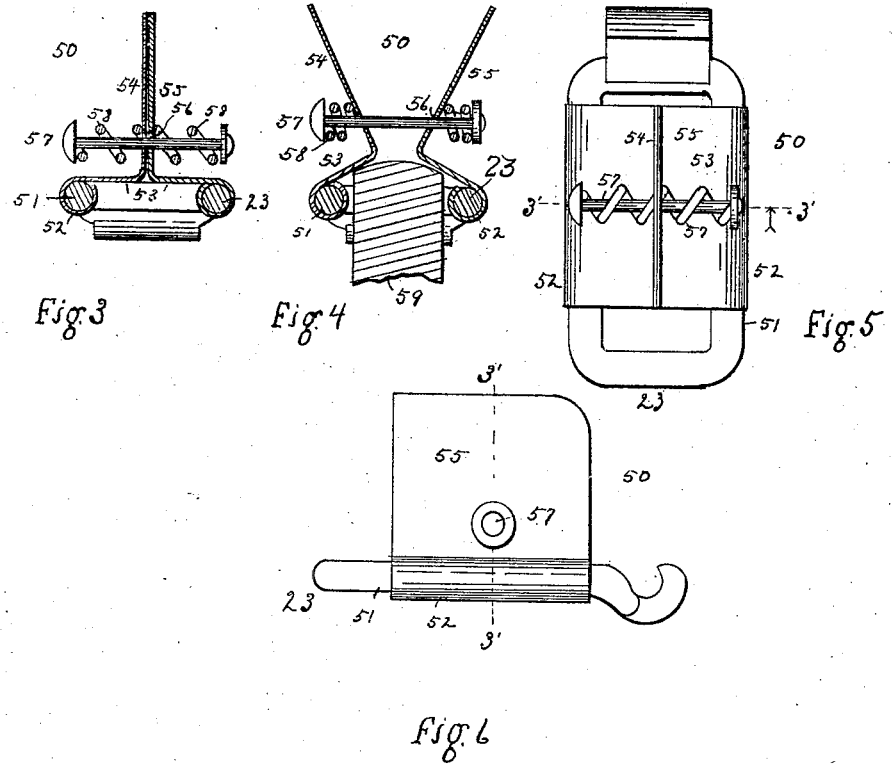

UNITED STATES PATENT OFFICE.

CHARLES E. DYER AND HERBERT N. DYER, OF ABILENE, KANSAS.

TRANSPLANTING-MACHINE.

No. 884,139.　　　Specification of Letters Patent.　　　Patented April 7, 1908.

Application filed June 13, 1907.　Serial No. 378,681.

*To all whom it may concern:*

Be it known that we, CHARLES E. DYER and HERBERT N. DYER, citizens of the United States, residing at Abilene, in the county of Dickinson and State of Kansas, have invented new and useful Improvements in Transplanting-Machines, of which the following is a specification.

The invention relates to machines used in the transplanting of cabbage plants, tomato plants, tobacco plants and other like vegetable plants.

Objects are to improve generally upon such machines; to simplify the mechanism involved, and to reduce the number of parts; and to provide a machine of the kind set forth which is easy of manufacture and simple and perfect in operation. And the invention consists of the parts, improvements, and combinations hereinafter set forth and claimed.

In the drawings accompanying and forming part of this specification, and in the description thereof, we have shown the invention in its preferred form, and have shown the best mode of applying the principles thereof; but it is to be understood that we do not limit our invention to the exact mechanism shown in the drawing and in the description of the drawing; that we contemplate changes in form, proportions, materials, the transposition of parts, and the substitution of equivalent members, without departing from the spirit of the invention.

Figure 1 is a plan view of the complete machine, some of the parts being broken partially away, and some, which are concealed from view, being shown in dotted outline. Fig. 2 is a sectional view of the machine, on the line 2'—2', of Fig. 1. The remaining figures are details of the clamping or clutching device. Fig. 3 is a cross-section, through the line 3'—3', of Figs. 5 and 6, the clamp being closed. Fig. 4 is a similar view, the clamp being opened. Fig. 5 is a top view of the clamp; and Fig. 6 is a side elevation thereof; in both figures, the clamp being closed, as in Fig. 3.

Like reference numerals indicate like or corresponding parts.

As a running gear for our machine we may use the four wheels 7, 7, 7, 7, mounted on the front and rear axles 8, 8, connected by the beams 9, 9. Above the front axle may be the cross-beam 10, to which the front axle may be pivoted by a king-bolt 11, with a fifth-wheel 12.

13 may be any suitable draft device, as a tongue, for pulling the machine.

In suitable bearings 14, 14 secured under the beams 9, 9, are the two shafts 15, 16. On the shaft 15 are keyed the large sprocket-wheel 17 and the small sprocket-wheel 19; and on the shaft 16 is suitably mounted the plain wheel or pulley 18. Sprocket-wheel 19 is connected with sprocket-wheel 21 secured to the traction wheel 7, by a sprocket-chain 20. A sprocket-chain 22 passes over the sprocket-wheel 16 and the wheel 18, and may be made up of adjustable links, 23, 23, in the usual manner of sprocket-chains. And this sprocket-chain carries a number of clutches or clamping devices 50, 50, (shown in detail in Figs. 3—6) whereby the plants are individually received from the operator and planted in the ground, as will hereinafter be explained. Above this planting-mechanism, is a tray 24 on suitable legs 25, 25.

At the front of the machine, as being suitably fastened to the cross-beam or any other part of the frame-work, is the divided shoe 26, by which the furrow, or trench, of the desired depth and width is made in advance of the planting apparatus. And at the two sides of the planting-sprocket are the presser blades 27, 27, by which the earth is returned into the furrow or trench and pressed properly into place around the plant which is being deposited by the planter-sprocket, as will be presently explained. These pressers may be secured to the lower ends of the rods 28 secured to the cross-beam 29, and may also be provided with additional braces 30. At the rear is a seat 31 on a spring 32 secured to a cross-beam 33. At the front on suitable supports 34, 34, is a tank or barrel 35, for containing water, provided with a discharge pipe 36 adapted to discharge the water into the trench in which the plants are being deposited. The pipe may be provided with a valve 37 operated by a wheel 38, cord 39 and wheel 40 on shaft 15. We have here shown merely an ordinary plug valve, and so arranged as to discharge a supply of water as each plant is deposited in the ground; but obviously any kind of valve whereby the water supply is properly regulated and controlled will do.

Referring now to the clutch or clamping-device. Onto each side-piece 51, 51 of the link 23 of the sprocket-chain, is hinged, 52, a plate which extends first inwardly 53, 53, to about the middle line of the link, and then upwardly so as to form the two co-acting clamping-jaws 54, 55. These are perforated at 56, and through these holes extends a rod 57, headed at both ends, and the two clamping-jaws are forced together by the two springs 58, 58. When the link which is provided with this clamping-device passes over the sprocket-wheel, the tooth 59 of the sprocket-wheel forces the jaws apart, as in Fig. 4, but as the link passes off the sprocket-wheel, the withdrawal of the tooth permits the jaws to assume their normal position, closed. Referring to Fig. 2, it will be noted that as the link containing the clamping-device (traveling from front to rear) comes into engagement with the lower part of the sprocket-wheel 17, the clamping-jaws will be forced open, thereby releasing whatever thing may happen to have been clamped between the jaws, as a plant; and when the same link leaves the sprocket-wheel at the top, traveling from rear to front, it will again clamp anything which may happen to be placed between the jaws.

The parts are so adjusted, as indicated in the drawings, that the travel of the sprocket-chain from front to rear is at the same speed as the travel of the machine itself forward, so that the chain remains stationary with relation to the ground over which it passes (as to the time between when it leaves the wheel 18 and engages sprocket-wheel 17). Also, the closeness of the planting may be regulated by inserting a greater number of the clamping-device links, or removing some; this being readily done by reason of the sprocket-chain.

The plants may be placed on the tray 24, and the operator may be seated on the seat 31. As the machine is drawn along, the divided-shoe 26 cuts the required trench or furrow, which is watered intermittently by the rotating valve 37. The operator feeds the plants into the clamping-devices on the sprocket-chain, as they are released at the top of the sprocket-wheel 17, whence they are carried around over the wheel 18, and deposited in the trench; and as the machine passes on the plant now being stationary with relation to the ground, the presser-blades 27, 27, press the earth back into the trench and around the plant as it is held by the clamping device. As the link engages with the tooth of the sprocket-wheel 17, the plant is immediately released, and the link may thus pass on up and around the sprocket-wheel for another plant. It will be thus understood that by properly placing the plants in the clamping-jaws, they will be properly set in the ground with the earth pressed firmly and properly around them, and at the same time they will have received a proper supply of water.

What we claim is:

1. The combination with a frame and running-gear, of a sprocket-wheel operated by the running-gear, another wheel, a sprocket-chain passing over both said wheels and traveling from front to rear at the same speed as the running-gear travels forward, a clamping device on said sprocket-chain operated by the teeth in the sprocket-wheel.

2. The combination with a frame and running-gear, of a sprocket-wheel operated by the running-gear, another wheel, a sprocket-chain passing over both said wheels and traveling from front to rear at the same speed as the machine as a whole travels forward so as to be stationary with relation to the ground, a clamping device on said sprocket-chain, normally closed but opened by the teeth of the sprocket-wheel.

3. The combination with a frame and running-gear, of a sprocket-wheel operated by the running-gear, a sprocket-chain passing over said sprocket-wheel and adapted to travel from front to rear at the same speed as the machine as a whole travels forward so as to be stationary with relation to the ground, and a clamping device on said chain operated by the sprocket-wheel.

4. The combination with a frame and running-gear, of a sprocket-wheel operated by the running-gear, a sprocket-chain passing over the sprocket-wheel and adapted to travel from front to rear at the same speed as the machine as a whole travels forward so as to be stationary with relation to the ground, and a spring-pressed clamping device on said chain, normally closed, but opened by the teeth of the wheel.

5. The combination with a frame and running-gear, of a sprocket-wheel operated by the running-gear, a sprocket-chain passing over the sprocket-wheel and adapted to travel from front to rear at the same speed as the machine as a whole travels forward so as to be stationary with relation to the ground, a spring-pressed clamping device on said chain operable by the teeth of the sprocket-wheel, a divided shoe forward of the sprocket-wheel and chain, and presser-blades on each side of the sprocket-wheel and chain.

6. The combination with a frame and running gear, of a large sprocket-wheel mounted in the frame just above the ground and operated by the running-gear at a speed, as to its lower portion, rearward equal to the speed of the machine as a whole forward so as to be stationary with relation to the ground, another and blank wheel loosely mounted in the frame forward of the sprocket-wheel, a sprocket-chain passing over and connecting the two wheels, spring-pressed plant clamping devices arranged at intervals along said sprocket-chain normally closed and adapted to be opened by the teeth of the sprocket-wheel, a divided shoe arranged in advance of the said two wheels and sprocket-chain to open a trench, a watering device, and pressers on each side of the chain for pressing the earth into the trench and around the plants while they are still held by the clamping devices.

7. In a planting machine, the combination with the sprocket-wheel and the sprocket-chain, of a pair of spring-pressed clamping jaws secured to the two sides respectively of a link in said chain.

8. In a planting machine, the combination with the sprocket-wheel and the sprocket-chain, of a pair of clamping-jaws hinged to the two sides respectively of a link in the chain and operable by the teeth of the wheel.

9. In a planting machine, the combination with a sprocket-wheel and a sprocket-chain, of a pair of spring-pressed clamping-jaws hinged to the two sides respectively of a link in said chain and opened by engagement with the teeth of the wheel.

In testimony whereof we have hereunto signed our names in the presence of witnesses.

CHARLES E. DYER.
HERBERT N. DYER.

Witnesses:
 CHAS. W. GANS,
 WM. E. BROWN.